Figure 1:
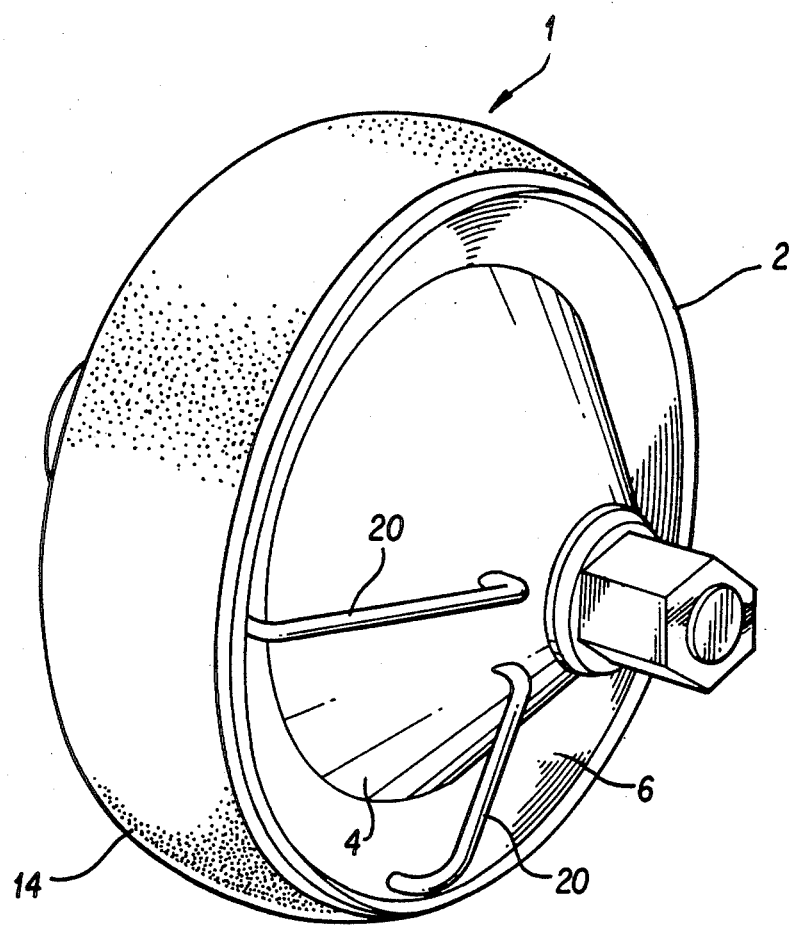

United States Patent [19]

Westman

[11] Patent Number: 4,687,026
[45] Date of Patent: Aug. 18, 1987

[54] EQUIPMENT FOR CLOSING CONDUITS

[76] Inventor: Stig Westman, Rafsvagen 22, S-740 40 Heby, Sweden

[21] Appl. No.: 823,462

[22] Filed: Jan. 28, 1986

Related U.S. Application Data

[62] Division of Ser. No. 657,169, Oct. 3, 1984, Pat. No. 4,585,033.

[30] Foreign Application Priority Data

Oct. 13, 1983 [SE] Sweden ................................ 8305640

[51] Int. Cl.⁴ ............................................. F16L 55/12
[52] U.S. Cl. .................................... 138/89; 81/57.22; 254/97
[58] Field of Search .................. 138/89; 220/235, 236, 220/237; 81/3 K, 3.2, 3.45, 57.13, 57.22, 57.29, 57.3; 254/85, 97

[56] References Cited

U.S. PATENT DOCUMENTS

| 996,461 | 6/1911 | Costa | 220/237 X |
| 1,213,800 | 1/1917 | Piper | 254/97 |
| 1,900,169 | 3/1933 | Duduletz | 81/57.29 |
| 2,583,266 | 1/1952 | Jenson | 81/57.29 |
| 4,202,377 | 5/1980 | Harrison | 138/94 |

Primary Examiner—Stephen Marcus
Assistant Examiner—Mark Thronson
Attorney, Agent, or Firm—Witherspoon & Hargest

[57] ABSTRACT

Equipment for closing conduits comprising a closing lid (1) having two circular disks with a peripheral sealing ring of resilient material. A tightening device connect the two disks at the center thereof causing during tightening to compress the sealing ring radially outwardly. The tightening device is of very stable construction conferring to the disks a parallel movement without mutual rotation. The equipment moreover comprises a mounting device (30) having three parts which are mobile in relation to each other, an attachment yoke (31), a main clamp (39) and a support plate (43). With the aid of a cog gear (40) and racks (42, 44) rotary movements are transformed into either a clamping movement between the closing lid (1) and the support plate (43) or a pulling movement between the closing lid (1) and the main clamp (39).

7 Claims, 6 Drawing Figures

EQUIPMENT FOR CLOSING CONDUITS

This application is a division of application Ser. No. 657,169, filed Oct. 3, 1984, now U.S. Pat. No. 4,585,033.

EQUIPMENT FOR CLOSING CONDUITS

The present invention relates to equipment for closing conduits in particular such equipment for both temporary and permanent closing of waste water and surface water conduits.

There are many different types of plugs and lids which are intended to be introduced into conduits for the purpose of closing them. Ordinarily they are provided with expandable rubber ring gaskets to provide the sealing. The expansion of the rubber ring gaskets may be performed, for example, by introducing pressurized air into ducts therein or by exposing the gaskets for a directed squeezing action.

Normally such plugs and lids are mounted in places where a mechanic may have free access to the conduit, for example, in a spacious manhole or the like. In exceptional cases, when space is limited such as in gullies where access is impossible, the mechanic uses a particular mounting device for mounting the plug or lid.

As far as mounting with the aid of a particular mounting device is concerned, no satisfactory device of this type has been at hand so far. The consequence has been that mounting with the aid of such a device has been performed when there were no specific requirements regarding the mounting of the plug or lid, for example during temporary closing of a conduit section where the only important requirement was a considerable limitation of the flow through the conduit. When the requirement in respect to closing the conduit was high, which is the case when a conduit is to be closed for the purpose of pressure-testing, it has not been possible to guarantee correct mounting of the plug or lid with the aid of previously known mounting devices.

A factor in connection with the exactitude of mounting is obviously also the construction of the plug or lid. Thus, it is important that the sealing ring may expand outwardly at a pressure that is equally distributed around the whole circumference. This is obtained to a great extent in plugs and lids which have sealing rings adapted to be expanded by pressurized air. However, pressurized air is not always available and it appears unnecessarily complicated and expensive to carry along pressurized-air units for expanding one or two sealing rings on the working site. Pressurized-air expanded sealing rings are not either expandable during an extended time and are therefore not suitable for plugs and lids which shall be used for permanent closing of conduits.

The present invention comprises a closing lid or plug of the type having two circular disks which may be pressed against each other to squeeze a sealing ring of synthetic or natural rubber positioned at the periphery of the disks in a radially outward direction. Such plugs or lids are known per se but present difficulties both as far as the radially outwardly directed expansion of the sealing rings and the guidance of the disks during compaction is concerned.

Surface water conduits ordinarily discharge into a recipient without any treatment of the surface water prior to discharge. As far as waste water conduits are concerned, a great problem resides in the fact that water which properly need not be purified leaches into these conduits and increases the amount of waste water requiring treatment in the purifying plant. This is uneconomical and may yield environment problems by supplying so much waste water to the purifying plant that there is insufficient time for purification and the water must be discharged into the recipient in a non-purified state.

An ordinary reason for unnecessarily large supply of water into drainage systems is that drainage conduits which are not in use are open. For example, when a house is pulled down, no care is taken to close the previously used drainage conduits which remain open and receive rain water, melt water and in certain cases even ground water. Such additional water carries sand and other impurities which may clog the conduit systems so that it is important, not only in respect to the problems mentioned previously, but also in respect to this latter problem that such conduits are closed.

Also during repair work it is desirable that certain conduit sections quickly and simply may be closed temporarily and this is also desirable for performing pressure tests. During pressure tests it is in addition necessary that the closing is efficient so that a pressure medium may not leach past the plug or lid as this would indicate a damage. Such closing is at present performed from gullies of sufficient size to enable a mechanic to reach and manually to mount and expand the plug or lid therein. This means that in many cases unnecessarily large portions of a conduit system will be unusable during the time required for the work to be performed. Thus, if the closing could be performed also from gullies which are so narrow that a mechanic can not enter them, the closed sections of a drainage system could be considerably diminished in comparison with present-day conditions.

It is a purpose of the present invention to eliminate the above-indicated problems. This purpose is realized by an equipment of the type indicated in the claims which also indicate the characteristic features of the invention.

Figure 2:
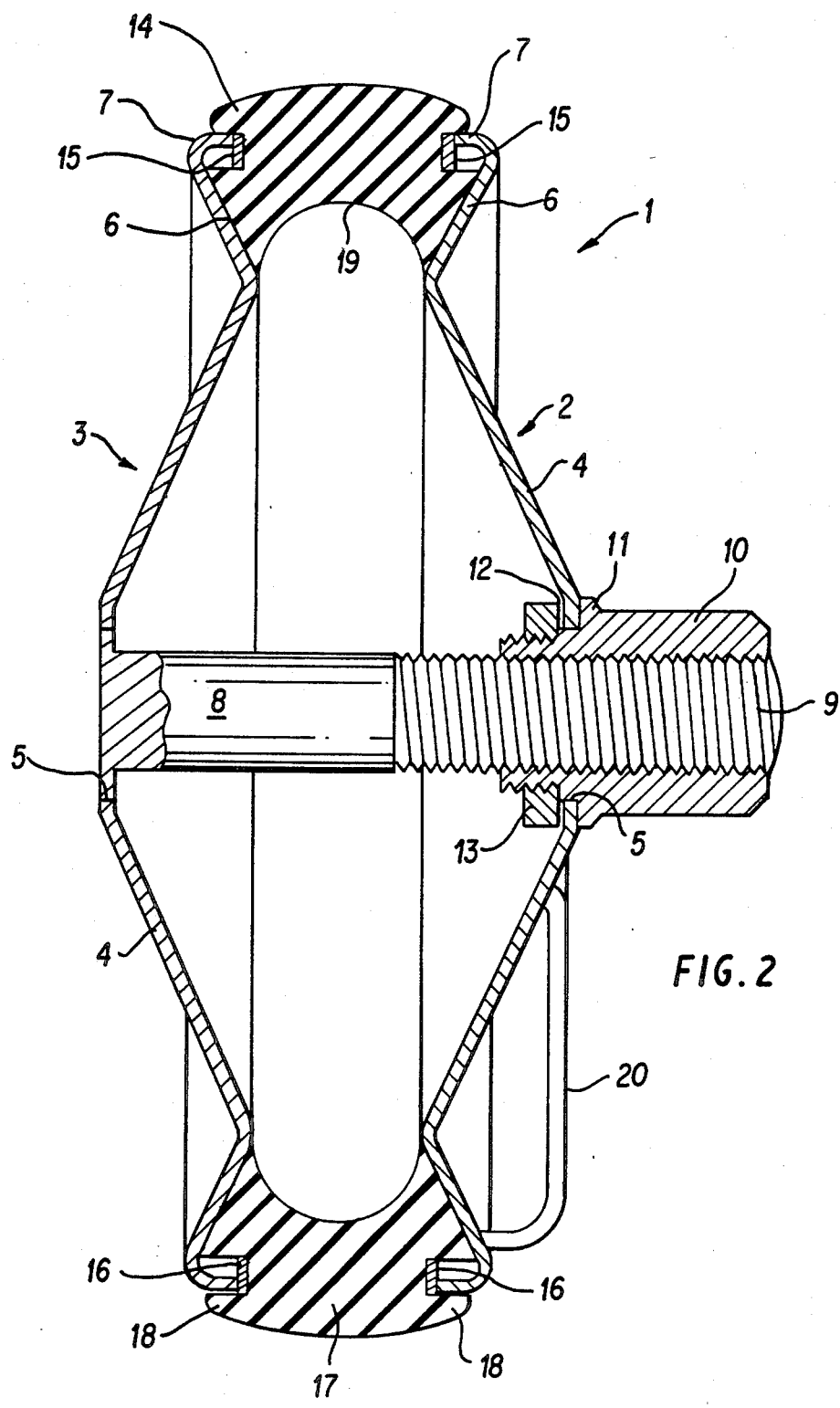
Figure 3:
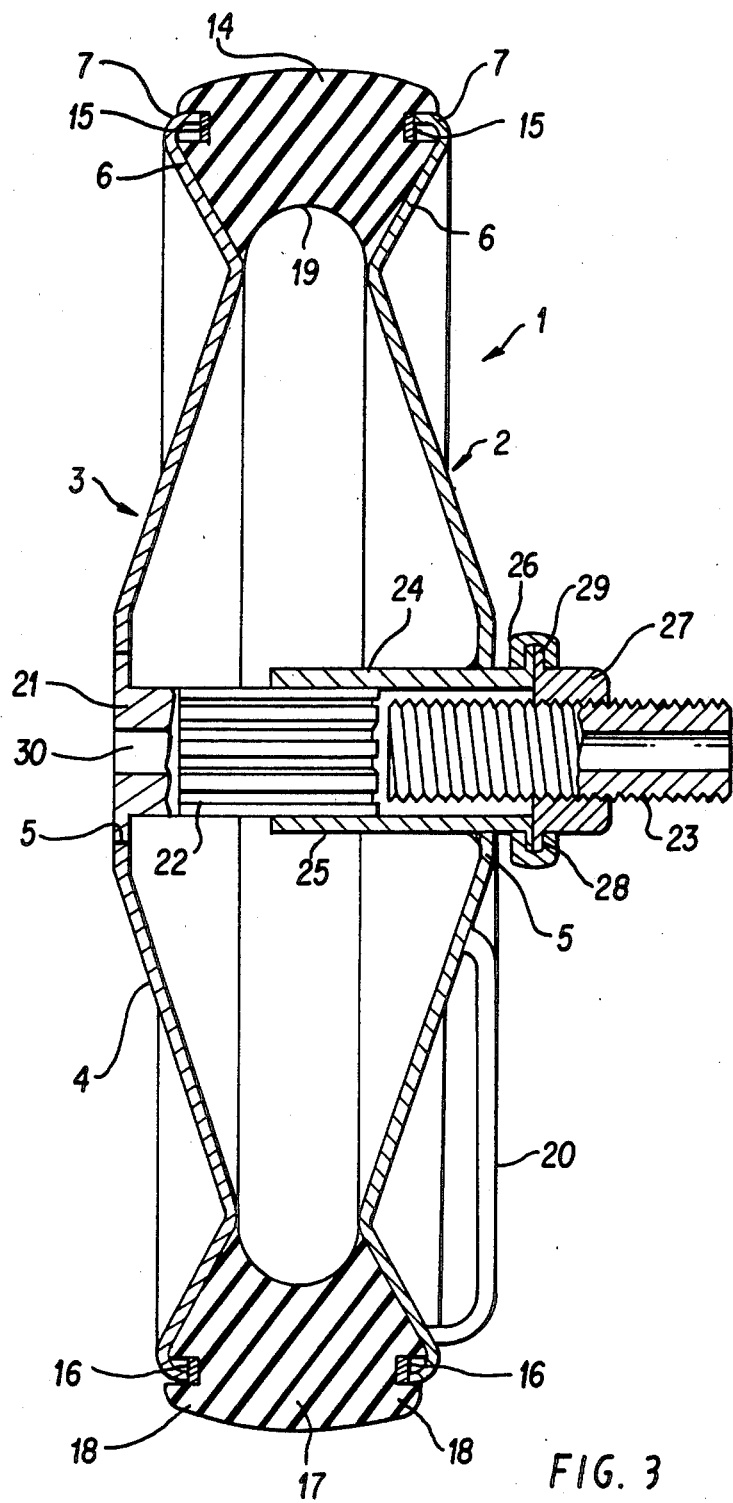
Figure 4:
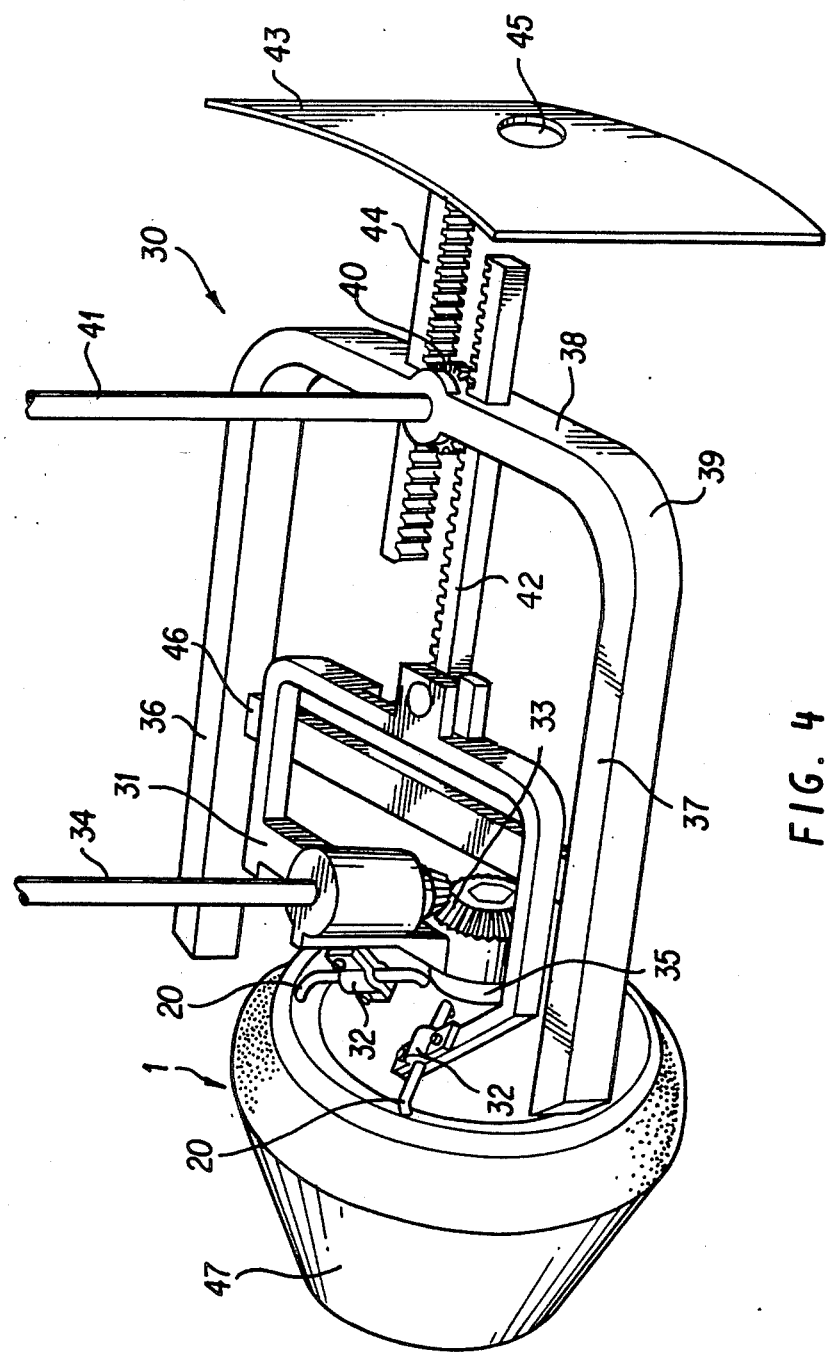
Figure 5:
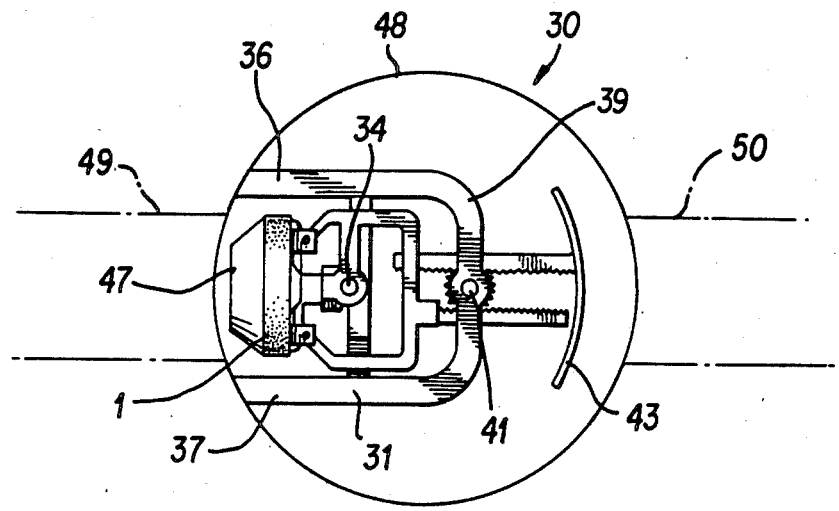
Figure 6:
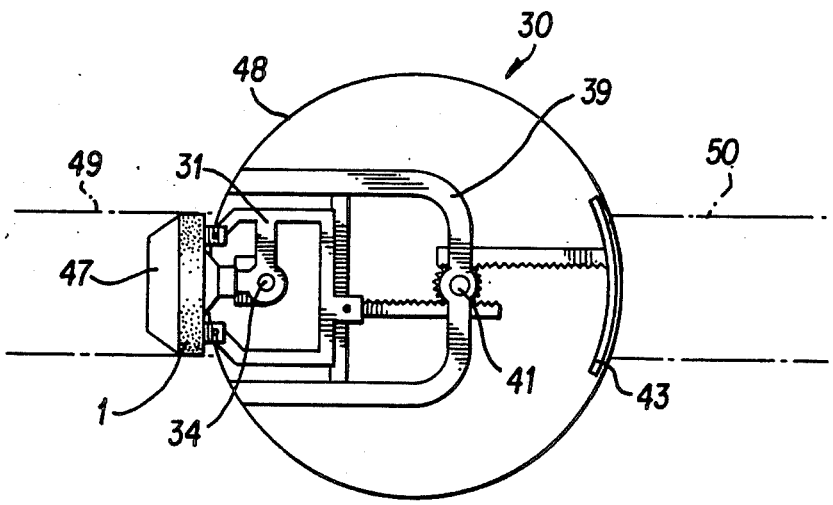

Hereafter, the invention will be described in detail by reference to the attached drawings in which FIG. 1 is a perspective view of a closing lid according to the invention, FIG. 2 is a section of the closing lid shown in FIG. 1 with one embodiment of the tensioning mechanism, FIG. 3 is a section of a closing lid similar to that according to FIGS. 1 and 2 and provided with an alternative tensioning mechanism and in an embodiment of reduced thickness, FIG. 4 is a perspective view of a mounting device for closing lids according to the invention, FIG. 5 is a schematic plan view of the mounting device shown in FIG. 4 in the starting position prior to mounting the closing lid, and FIG. 6 is a view corresponding to FIG. 5 but showing the mounting device in the position in which the closing lid is positioned in the conduit which as far as the mounting device is concerned is both the position in which the mounting of the lid is performed and the position in which the mounting device is ready to release and remove the lid.

In FIGS. 1 and 2 one embodiment of a closing lid 1 according to this invention is shown. This closing lid is of comparatively sturdy design and is particularly well suited for permanent closing of tubular conduits. It comprises two identically shaped circular disks 2, 3 which are facing each other and are mutually connected and which form a central element the shape of which reminds of that of a molded steal rim for a vehicle wheel.

Both disks 2, 3 have a central portion 4 in the shape of an outwardly facing cone in the apex of which a throughhole 5 is provided. From the base of cone 4 extends an annular portion 6, the rim edge, in an oblique outward direction and its free outer edge 7 is bent back in the direction towards the outer edge of the opposed disk.

A stud 8 is attached, for example by welding, to the bottom of one of the disks 3 which means that the end of the stud is positioned within hole 5 in this disk 3 and that the stud extends through hole 5 in the opposite disk 2. The free end of stud 8 is provided with a thread 9 and is received in a nut 10 which is attached to disk 2 in such a way as to be rotatable in hole 5 but immobile in the axial direction. Thus nut 10 has a collar 11 abutting against the region surrounding hole 5, a neck 12 extending through hole 5 and a nut 13 screwed onto neck 12 and abutting against the inner surface of disk 2 around hole 5. In some suitable way nut 13 is immobilized in one position whereby nut 10 may be rotated without causing nut 13 to become detached or to change its distance from collar 11 whereby a clamping effect is obtained. However, the attachment of nut 10 is such that it is securely guided in its position which is of importance during mounting of lid 1 in such a way that disks 2 and 3 are pulled straight against each other without risk of inclination or shifting in relation to each other which might prevent the sealing ring from reaching a position of correctly sealing abutment.

A circular, flexible sealing ring 14 is on its axially opposed sides shaped substantially in agreement with the inner side of the annular portion 6 and vulcanized or in any other way attached thereto. An annular groove 15 is formed in the axially opposed sides and into this groove extends the free outer surface 7 of disks 2, 3. In the embodiment shown a ring 16 of resilient material and of greater resistance to wear than the sealing ring 14 is inserted into the bottom of each groove 15. This prevents the free outer edge 7 from penetrating into the sealing ring 14 during use and the ring 16 may be easily exchanged whereas sealing ring 14 is not exposed to the same wear which means that this construction considerably increases the lifetime of the closing lid 1.

The sealing ring 14 has an outwardly facing circumferential surface 17 which in cross-section is slightly vaulted and provided with a pair of flaps 18 extending over the outer free edges 7. Due to the attachment of nut 10 as described disks 2, 3 may be urged apart causing the sealing ring 14 to be axially expanded. In this condition the peripheral surface 17 is substantially plain causing the closing lid 1 to assume a diameter less than the state shown in the drawing which is the normal state and thereby enabling the lid to be introduced into tubular conduits deviating slightly from the dimensions for which the closing lid 1 is properly dimensioned.

The radially inward facing side of sealing ring 14 has in cross-section substantially semicircular shape 19 extending between the bases of cones 4. This shape is particularly advantageous during expansion in that forces from the two compressed disks 2, 3 thereby are directed radially outwardly causing the sealing ring 14 to be pressed under a uniform pressure against the inner wall of the surrounding tube.

For handling the closing lid 1 the one disk 2 is provided with a pair of handles 20. These may be used during the application of lid 1 by being grasped by the hands of the mechanic. The handles 20 are also adapted to be used as attachment for particular mounting devices as will be described further down.

The embodiment of the closing lid according to the invention as shown in FIGS. 1 and 2 has a comparatively large sealing ring 14 rendering the lid particularly suited for permanent closing. The embodiment of the closing lid according to the invention as shown in FIG. 3 has the same fundamental construction as the lid shown in FIGS. 1 and 2; corresponding parts therefore have the same reference numerals. However, the closing lid according to FIG. 3 has reduced thickness compared to the embodiment according to FIGS. 1 and 2 which means that the conical portions 4 are not so high while at the same time the sealing ring 14 is narrower.

The essential difference between the two embodiments resides in the construction of the central connecting of tightening mechanism. A stud 21 is welded or otherwise permanently attached to the bottom of the one disk 3 which means that the stud with one end is positioned in hole 5 in this disk 3 and extends outwardly through hole 5 in the opposed disk 2. The inner portion of stud 21 is provided with splines 22 and the outer portion beyond the splines 22 is provided with a thread 23.

A tubular guide 24 is weldingly attached to disk 2 in hole 5 and extends inwardly a distance about stud 21. Guide 24 is provided with splines 22 co-operating with the splines 22 of stud 21. Hereby the disks 2 and 3 are prevented during compression from turning in relation to each other not only under the action of the sealing ring 14 but also through the splines connection 22, 25.

The tubular guide 24 extends a short distance outwardly through hole 5 and is terminated there by a radially outwardly directed collar 26. A nut 27 which is screwed onto the threaded portion 23 of stud 21 has a corresponding collar 28, both collars 26, 28 being enclosed by a clamp 29. The result obtained thereby is that nut 27 in the same way as nut 10 in the previously described embodiment may be rotated but can not be shifted in an axial direction.

Moreover, the embodiment of the closing lid according to the invention as shown in FIG. 3 has a hole 30 extending through stud 21. This hole is intended to be used during pressure-testing of tubular conduits for introducing pressure medium between two or more closing lids 1. Normally, this hole may be closed by a screwed closing plug which is unscrewed and removed during pressure-testing.

FIG. 4 is a perspective view of a mounting device 30 intended to be used for mounting closing lids 1 according to the invention from gullies which are too narrow to enable a mechanic to enter them. The mounting device comprises an attachment yoke 31 having clamps 32 attached to the handles 20 of the lid 1. In FIG. 4 the clamps 32 are shown as firmly attached, but it is to be understood that these clamps are adapted to be attached and released from a space above the gully, for example by means of cords actuating an attachment mechanism connected to the clamps 32 or replacing them.

The attachment yoke 31 in addition is provided with an angular gear 33 which transmits rotary motion from a shaft 34, extending from the mouth of the gully downwardly to the mounting device 30, to a sleeve 35 which is in detachable engagement with the jamb nut 10, 27 on the closing lid 1.

The attachment yoke 31 is positioned between the legs 36, 37 of a U-shaped main clamp 39, the spacing between the ends of legs 36, 37 being larger than the diameter of the mouth of the tubular conduit in which the closing lid 1 is to be mounted or is mounted. In the web 38 of the main clamp 39 positioned opposite to lid 1 a cog wheel 40 is supported for rotation with the aid of a shaft 41 which in the same way as shaft 34 extends from a position above the mouth of the gully. A rack 42 extending from the attachment yoke 31 at which it is pivotally attached, extends through the web 38 in a guided way and in engagement with cog wheel 40. From a support plate 43 positioned outside the web 38 a rack 44 extends through the web 38 in a guided way and in engagement with cog wheel 40 on the opposite side thereof in relation to rack 42. Both racks 42, 44 are suitably exchangeable in a simple way to enable the mounting device to be adapted for gullies of varying diameters. The support plate 43 has a hole 45 through which rack 42 may extend. A support bar 46 extends between the legs 36, 37 of the main clamp 39 to form a support for attachment yoke 31. The closing lid 1 is provided with a guide 47 in the form of a conical piece. This guide facilitates introduction of the closing lid 1 into the conduit.

From FIGS. 5 and 6 it appears how the mounting device 30 is adapted to be used. The mounting device 30 with the closing lid 1 attached thereto is lowered into gully 48, the mechanic using shafts 34, 41 for this purpose. In the bottom of gully 48 there is normally a groove extending between the attached conduits 49, 50 and having a shape corresponding to the lower portion of the attached conduits 49, 50. This means that the closing lid 1 may be guided into correct position with the aid of this groove.

By rotating shaft 41 the legs 36, 37 of the main clamp 39 will be caused to abut against the gully wall at the mouth of conduit 49 while the support plate 43 will come into contact with the opposed gully wall. The support plate 43 is larger than the mouth of the opposed conduit 50 and in addition slightly displaced in relation to the center of the closing lid 1.

In this position lid 1 will start to be urged into the conduit 49 by the interaction between support plate 43 and attachment yoke 31. When lid 1 has come into the correct position, which normally may be observed from the gully mouth either directly or with the aid of inserted mirrors, the mechanic turns shaft 34 causing the sealing ring 14 on the lid to be expanded by means of the previously described angular gear and sleeve connection.

When the lid is mounted the mechanic pulls the releasing ropes for attachment clamps 32 after return rotation of shaft 41 causing the support plate 43 to become spaced from the gully wall, whereafter the whole mounting device 30 may be lifted out.

If a closing lid 1 shall be removed from its position in a conduit 49 with the aid of a mounting device 30, this is lowered into gully 48 and the attachments 32 are brought into engagement and latching relationship with the handles 20. By rotating shaft 41 in the direction opposite to the direction of attachment the legs 36, 37 of the main clamp 39 are brought to a position appearing from FIG. 5. By continued rotation lid 1 is pulled out of conduit 48 to the position shown in FIG. 5.

As appears from the above, the present invention yields an equipment for closing conduits complying with the purposes defined initially. The expert on the field will appreciate that variations and modifications of the invention are possible and must be considered to fall within the frame of the invention as defined in the attached claims.

What is claimed is:

1. A mounting device for closing a conduit disposed in the ground using a closing lid to be positioned within said conduit relative to the internal surface of said conduit and having a first disk and a second disk, a sealing ring of resilient material positioned between said first and second disks, and a nut member for axially moving said disks relative to each other in an axial direction, when said nut member is rotated, to cause said sealing ring to move in a radial direction relative to said internal surface of said conduit, comprising:

a U-shaped main clamp having a first pair of spaced legs coupled by a first web, each leg having an end which forms a first support surface;

a second support surface having a first rack extending therefrom, said first rack extending in a first direction through an aperture in said first web and being movable relative to said first web;

a U-shaped attachment yoke including a second pair of spaced legs coupled by a second web;

a second rack pivotally coupled to said second web and extending in a second direction through said aperture in said first web and being movable relative to said first web, said second direction being opposite to said first direction;

a cog wheel operatively positioned in said aperture and meshing with said first rack and said second rack, said cog wheel including a first shaft which extends through said first web for turning said cog wheel to cause said first rack and said second rack to move relative to said first web in opposite direction; and, means coupled to said U-shaped attachment yoke for rotating said nut, said means including a sleeve for engagement with said nut, said sleeve being coupled to a first angular gear, and a second angular gear which mates with said first angular gear and includes a second shaft which extends from said second angular gear for turning said second angular gear to cause said first angular gear to rotate said sleeve.

2. The mounting device of claim 1 wherein said first and second racks and a longitudinal axis of said first angular gear extend in one direction, and wherein said first and second shafts and a longitudinal axis of said second angular gear extend in another direction, said one direction being oriented perpendicularly relative to said another direction.

3. A mounting device for closing a conduit disposed in the ground using a closing lid to be positioned within said conduit relative to the internal surface of said conduit and having a first disk and a second disk, a sealing ring of resilient material positioned between said first and second disks, and a nut member for axially moving said disks relative to each other in an axial direction, when said nut member is rotated, to cause said sealing ring to move in a radial direction relative to said internal surface of said conduit, comprising:

a main clamp member having a first end which forms a first support surface, and a second end;

a second support surface having a first rack extending therefrom, said first rack extending in a first direction and being coupled to said main clamp member at said second end, said second support surface and said first rack being movable relative to said second end;

an attachment member having a second rack extending from one end thereof, said second rack extending in a second direction opposite of said first direction and being coupled to said main clamp member at said second end, and having another end, said attachment member and said second rack being movable relative to said second end;

a cog wheel operatively positioned relative to said first and second racks for causing said first and second racks to move relative to said second end of said main clamp in opposite directions; and, a nut rotating member coupled to said another end of said attachment member including a nut engaging sleeve, a first angular gear attached to said nut engaging sleeve, a second angular gear mating with said first angular gear, and a shaft extending from said second angular gear for turning said second angular gear.

4. The mounting device of claim 3 wherein said second rack is pivotally coupled to said attachment member.

5. The mounting device of claim 3 wherein said first support surface is larger than the diameter of said conduit.

6. The mounting device of claim 3 further including clamps for attachment to said lid, said clamps being attached to said another end of said attachment member.

7. The mounting device of claim 3 wherein said first and second racks and a longitudinal axis of said first angular gear extend in one direction, and wherein a longitudinal axis of said second angular gear and a longitudinal axis of said cog wheel extend in another direction, said one direction being oriented perpendicularly relative to said another direction.

* * * * *